Figure 1:
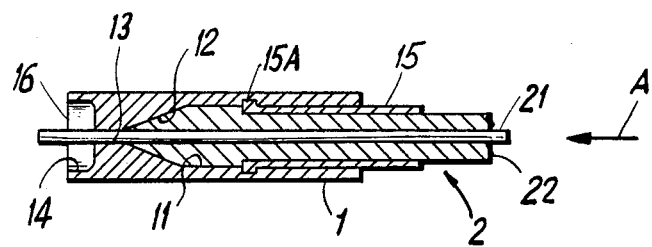

OR 4,023,886

United States

Nakayama et al.

[11] 4,023,886
[45] May 17, 1977

[54] OPTICAL TRANSMISSION CABLE TERMINAL AND CONNECTOR APPARATUS

[75] Inventors: Osamu Nakayama; Keizo Baba, both of Tokyo, Japan

[73] Assignee: Nippon Electric Company, Ltd., Tokyo, Japan

[22] Filed: June 2, 1975

[21] Appl. No.: 582,926

[30] Foreign Application Priority Data

June 5, 1974 Japan .............................. 49-63777

[52] U.S. Cl. ............................................. 350/96 C
[51] Int. Cl.² ........................................ G02B 5/14
[58] Field of Search .................................. 350/96 C

[56] References Cited
UNITED STATES PATENTS 3,810,802  5/1974  Buhite et al. ................ 350/96 C X
3,861,781  1/1975  Hasegawa et al. ............... 350/96 C

*Primary Examiner*—David H. Rubin
*Attorney, Agent, or Firm*—Hopgood, Calimafde, Kalil, Blaustein & Lieberman

[57] ABSTRACT

A terminal for an optical transmission cable, e.g., formed of a central optical fiber surrounded by a heat-deformable plastic coating, comprises a metallic body portion with an axial bore having a relatively small, fiber receiving aperture, an expanding tapered portion, and a cylindrical portion. A heat insulative sleeve is disposed about the bore end at the optical cable receiving face of the terminal.

To affix the terminal to a cable end, the terminal body is heated, and the cable axially urged through the bore. The heated terminal body deforms the cable coating, locking the cable into place with the fiber projecting through the relatively small bore aperture, when the assembly cools. The insulative sleeve prevents cable deformation and attendant spurious optical misalignment about the end of the terminal by there separating the cable coating and the heated terminal body.

Two terminated optical transmission cable segments may be connected by simply inserting the two terminal body members within an outer sleeve.

4 Claims, 2 Drawing Figures

OPTICAL TRANSMISSION CABLE TERMINAL AND CONNECTOR APPARATUS

DISCLOSURE OF INVENTION

This invention relates to optical transmission apparatus and, more particularly, to an optical fiber terminal structure which may be employed to termination and to separably connect optical fibers.

The assignee of the present invention has heretofore proposed a connector structure for optical transmission bodies, i.e., optical transmission cables comprising an optical fiber coated with a thermoplastic material. Such a connector is disclosed in U.S. patent application Ser. No. 407,674, now U.S. Pat. No. 3,861,781 to Hasegawa et. al. entitled "Separable Optical Fiber Connector and the Method of Manufacturing the Same. "Principal objects of this prior application are to provide a method and structure permitting the cable thermoplastic coating to be removed about the cable end without damaging the optical fiber, and to optically couple a pair of optical transmission cables to each other and hold them in position, with their optical axes maintained in alignment.

To achieve this, a cylindrical metal terminal member fitted to an end portion of the optical transmission body has a uniquely shaped axial bore, or through-hole. More specifically, the one end of the through-hole has its internal diameter approximately equal to the diameter of the optical transmission cable including the thickness of the coating. The metal bore is approximately equal near its other end to the diameter of the optical fiber itself; and the through-hole is monotonically tapered in its intermediate portion. That is, the bore or through-hole, as viewed at one end of the terminal member, progresses in tapering fashion from an end opening of a diameter approximately as large as the diameter of the optical transmission body, to a narrow opening portion of a diameter approximately as large as the diameter of the optical fiber. The end of the terminal member near the small aperture has a shallow recess.

To attach the metal terminal member to an end of an optical transmission body, the metal terminal member is preheated to a temperature slightly higher than the softening point of the optical cable. The end of the optical transmission body is then pressed into the metal terminal member. As it advances, the coated material softens, readily separates from the optical fiber, and fills the through-hole.

The optical transmission cable is pressed further into the bore until the end of the optical fiber protrudes out of the other end of the terminal member. The recess is then filled with a bonding and fixing agent, which fixes the protruding end of the optical fiber to the end of the terminal member. Both ends are polished to a mirror-like surface, the side of the cylindrical terminal member being finished to a smooth, fine cylindrical surface beforehand.

The desired optical connector is realized by simply employing terminal members affixed to the ends of a pair of optical transmission cable lengths. The optical terminals are then inserted into a cylindrical sleeve (from different directions), the internal diameter of the sleeve being equal to the outer diameter of the two cable terminals.

In our prior technique, however, the thermoplastic coating on the optical transmission body readily softens when it is brought into contact with the terminal member when the optical transmission body is pressed into the preheated terminal member. This renders it very difficult to align the axis of the terminal member with the axis of the optical transmission body, i.e., the axis of the optical fiber. More specifically, it becomes very likely that the axis of the optical fiber deviates from that of the terminal member in the vicinity of the opening of the metal bore, or through-hole. As a result, an angular displacement is created between the axis of the optical fiber and that of the terminal member. This is why positional and angular displacements arise between the two axes at the ends thereof. Prior art techniques have failed to solve this problem because it has been virtually impossible to provide a sufficiently long, narrow hole closely fitting the optical fiber, and because the diameter of the narrow hole must be slightly larger than that of the optical fiber in order to facilitate fitting the optical fiber into the hole.

It is therefore an object of the present invention to provide improved optical terminal and connector apparatus.

More specifically, it is an object of the instant invention to provide an optical fiber connector capable of facilitating fitting an optical fiber into a narrow hole without causing a thermoplastic fiber coating to be softened loose, thus preventing the optical from deviating from its desired axial optical alignment.

Figure 2:
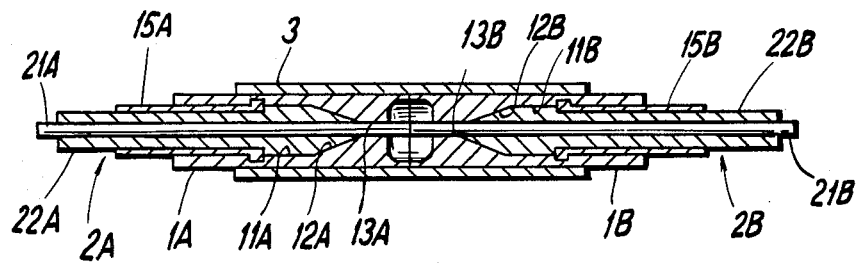

Further objects, features and advantages of the invention will become more clear from the following description of optical terminal and connector apparatus, presented hereinbelow in conjunction with the accompanying drawing, in which FIG. 1 is an axial cross-sectional view showing optical terminal apparatus illustrating the principles of the present invention; and FIG. 2 is an axial cross-sectional view showing an optical connection formed between a pair of terminated optical transmission bodies having their end terminals inserted in a metallic connecting sleeve.

Referring now to Figure 1, an embodiment of an optical connector terminal in accordance with the instant invention is shown in axial cross-sectional view, and comprises a cylindrical terminal member 1 made of metal, and an optical transmission body 2. These components, provided separately, undergo an engagement processes. The terminal member 1 has along its axis a through-hole 11, or bore, comprising a tapering part 12 and an axial portion of small diameter 13. Each of the bore portions 12 and 13 are axially aligned with the axis of the through-hole 11 and are located remote from the front or optical receiving, terminal. The small-diameter portion 13 has a recess 14 at the opening on the other, remote terminal end side.

To the right (facing the drawing,) in the vicinity of its opening, the through-hole 11 has a sleeve-like guide member 15 made of a material, such as Teflon, characterized by a softening point which is comparatively high. The guide member 15 has a cut portion in the circumferential direction and is closely fitted to the inner wall of the through-hole 11 by the radially outwardly-acting restoring force. To prevent the guide member 15 from sliding in the axial direction, a radially projecting shoulder portion 15A is formed at the end of the guide member 15, and fits in a circular groove formed on the inner wall of the bore 11. By carefully preparing the through-hole 11 and the guide member 15, the two components 11 and 15 can be axially aligned with each other.

The optical transmission body 2 to be united with the terminal member 1 comprises an optical fiber 21 having a coating 22 of a thermoplastic material therearound. The outer diameter of the optical transmission body 2 is approximately equal to the internal diameter of the guide member 15 to allow the optical transmission body 2 to be slipped into the guide member 15. The outer diameter of the optical fiber 21 is approximately equal to the internal diameter of the small-diameter aperture 13.

To fit the optical transmission body 2 into the terminal member 1, the terminal member is preheated to a temperature slightly higher than the softening point of the coating 22, but sufficiently lower than the softening point of the guide member 15. The optical transmission body 2 is then pressed into the guide member 15 in the direction of arrow A along the axis of the terminal member 1. This strips off the coating 22 from the optical fiber 21 in the tapering area 12 of the terminal 1, thus enabling the optical fiber to pass through the small aperture 13 and protrude out of the end 16 of the composite terminal 1 on the side of the recess 14. By the time the optical fiber comes out of the terminal end 16, the deformed thermoplastic coating 22 fills the space defined by the through-hole or bore 11.

During such insertion, the guide member 15 serves as a thermal insulator for the optical transmission body 2, and thereby precludes the optical transmission body 2 from being softened and deformed at the opening of the through-hole 11. The thermoplastic material removed from the optical fiber 21 in the tapering bore length 12 and utilized to fill the space inside the through-hole 11 is retained about the end portion of the guide member 15, thus serving as a stopper member when the plastic cools and thereby hardens.

After insertion and cooling, the recess 14 is filled with a bonding and fixing agent (not shown in the drawing) such as epoxy resin to bond and fix the protruding end of the optical fiber thereto, and the resultant surface at the end of the optical fiber is polished to a mirror-like plane flush with the end of the terminal member 1. This completes the procedure for terminating one coated optical fiber cable.

FIG. 2 is an axial cross-sectional view showing two joined, terminated coated optical fibers. The arrangement comprises a cylindrical sleeve member 3 surrounding and connecting a pair of optical transmission bodies 2A and 2B equipped with terminal members 1A and 1B, respectively, as depicted in FIG. 1 and fully discussed hereinabove. Like components are indicated by identical reference numerals in FIGS. 1 and 2. In FIG. 2, the optical transmission bodies A and B are shown on the left and right, respectively.

As described above, the present invention thus utilizes a thermally insulative guide member 15 to improve the terminal-connector structure set forth in the above identified application, thereby facilitating optical connection between a pair of optical transmission bodies in an optical fiber connector.

In the foregoing embodiment, the terminal member 1, optical transmission body 2, through-hole 11 and guide member 15 are described as being circular in cross section. Instead, these components may assume other cross sectional forms as long as the shape of cross section is of point-symmetry, as will be apparent to those skilled in the art. Also, according to the instant invention, the need for the recess 14 and the bonding and fixing agent which fills the recess may be eliminated if the thermoplastic material filling the space in the through-hole 11 can be cooled and hardened with sufficiently high accuracy. In addition, numerous other modifications and variations to the disclosed embodiment will be readily apparent to those skilled in the art without departing from the spirit and scope of the present invention.

The above described arrangement is merely illustrative of the principles of the present invention. Numerous modifications and adaptations thereof will be readily apparent to those skilled in the art without departing from the spirit and scope of the present invention.

What is claimed is:

1. A terminal member for an optical transmission cable, said cable having an inner fiber and an outer thermoplastic coating, said terminal member being formed of metal and being of symmetrical cross-section with respect to its central axis and defining a bore extending axially there-through, said bore having a first portion of relatively large inner diameter, that is larger than the outer diameter of said thermoplastic coating, extending inwardly, from one end of said terminal member, a recess formed in the wall of said first portion at a point predetermined distance from said one end, a second portion having a relatively small inner diameter, which is substantially equal to the diameter of said fiber, extending inwardly from the other end of said terminal member, and a tapering portion extending between said first and second portions, wherein the improvement comprises a sleeve-like guide member of a thermally insulating material which is radially disposed within said first portion of said bore, said sleeve having first and second ends and an outer diameter which is substantially equal to the inner diameter of said first portion of said bore and an inner diameter which is substantially equal to the diameter of the thermoplastic coating of said transmission cable, and a flange extending radially outwardly from said sleeve at a point adjacent to a first end thereof, said flange, being adapted to extend into said recess formed in the wall of said first portion to hold said sleeve is a predetermined axial position within said first portion of said bore.

2. A terminal member as claimed in claim 1 in which said thermally insulating material is Teflon.

3. A terminal member as claimed in claim 1 in which said second end of said sleeve-like guide member extends beyond said one end of said terminal member.

4. A combination as in claim 1, wherein said terminal body includes a recess about an end of said relatively small aperture portion.

* * * * *